UNITED STATES PATENT OFFICE.

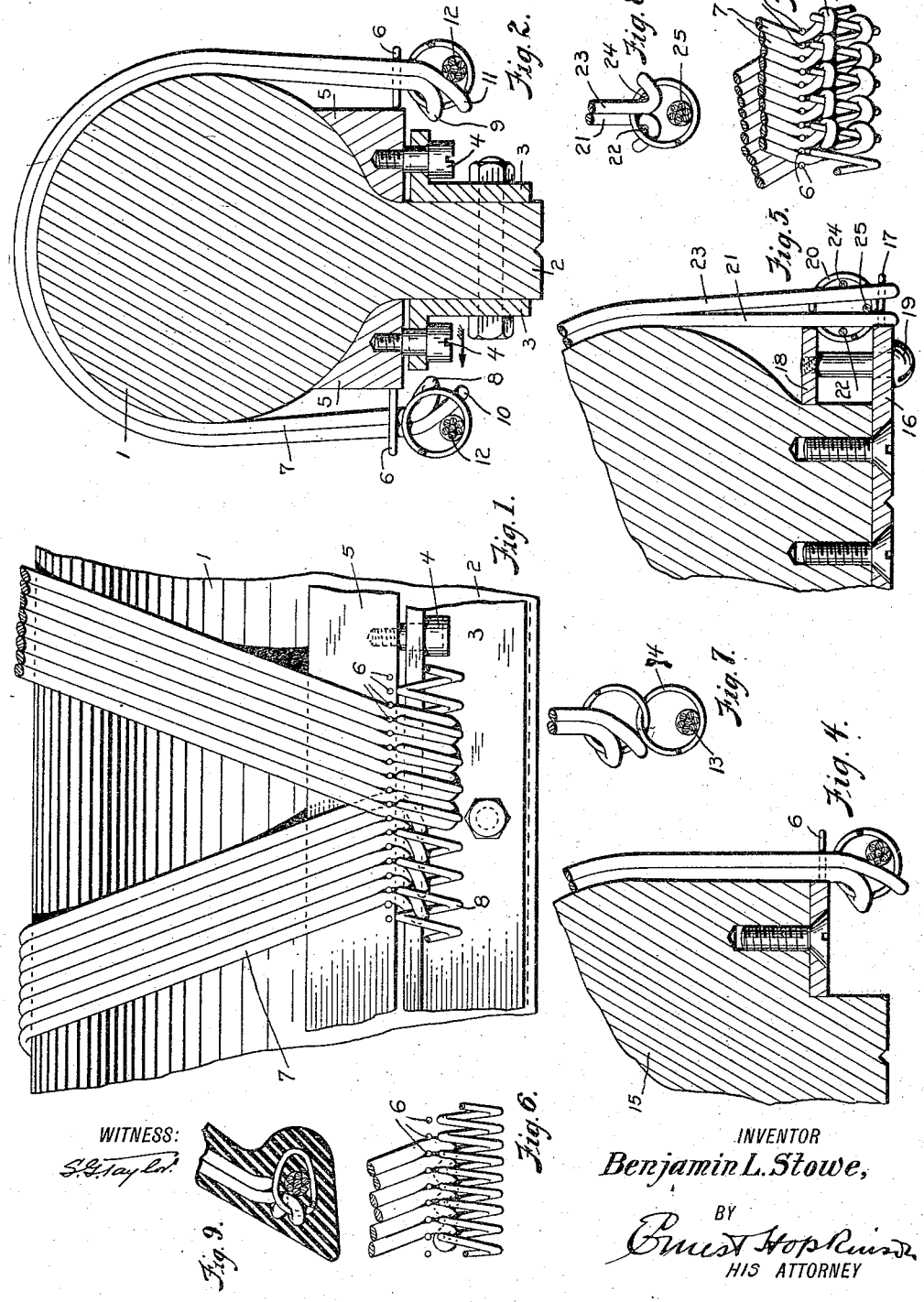

BENJAMIN L. STOWE, OF JERSEY CITY, NEW JERSEY, ASSIGNOR TO MORGAN & WRIGHT, A CORPORATION OF MICHIGAN.

ANCHORING MEANS FOR TIRE FABRICS.

1,228,144.

Specification of Letters Patent.

Patented May 29, 1917.

Application filed July 25, 1916. Serial No. 111,123.

*To all whom it may concern:*

Be it known that I, BENJAMIN L. STOWE, a citizen of the United States, residing in Jersey City, county of Hudson, and State of New Jersey, have invented certain new and useful Improvements in Anchoring Means for Tire Fabrics, of which the following is a full, clear, and exact description.

This invention relates more particularly to what are known as "cord tires", that is, tires in which the yarn, threads or cords are located in the carcass of the tire so that they extend from one anchoring ring to the other along parallel lines and are not positively bound together transversely except in so far as the rubber serves such purpose. The object of my invention is to provide a new and improved means for anchoring the ends of the cords at the bead core or wire, which anchoring means may be easily attached to the cords during the process of manufacture and positively retain the cords in position. It is also the object of my invention to provide such anchoring means that may be quickly and easily attached to the cords as they are successively placed in position about the core on which the carcass is formed.

Briefly stated, my invention comprises the use of a helical coil of steel wire or other metal which is located within the bead portions of the tire, around which the threads of the outer covering are looped without the necessity of using independent anchoring pieces.

For a detailed description of several forms of my invention, reference may be had to the following specification and to the accompanying drawings, in which:

Figure 1 is a side elevation of a portion of a tire forming core, indicating the manner of forming the carcass and attaching the same to the anchoring wires;

Fig. 2 is a transverse sectional view of the core of Fig. 1;

Fig. 3 is a detail view of a wire coil removed from the core and showing the relation of the loops of the cord and wire as viewed from the inside, or in the direction of the arrow in Fig. 2;

Fig. 4 is a fragmentary view of another form of core;

Fig. 5 is a sectional view of another form of core showing a different method of attaching the bead wires;

Fig. 6 is a figure similar to Fig. 3, but showing anchoring coil with greater number of helical turns;

Fig. 7 is a view illustrating a modified way of attaching the anchoring bead wires to the coils;

Fig. 8 illustrates another modified way of attaching the ends of the loops to the helical coils;

Fig. 9 is a sectional view of the bead of a clencher tire showing one way of disposing the wire coil within the same.

Referring to the drawings, the numeral 1 indicates a suitable core which may be made as usual, of cast iron, or may be made of wood, if not intended to serve as a form during vulcanization. This core is preferably provided with an internal rib 2 which is adapted to have bolted on each side thereof arc-shaped angle irons 3 forming brackets through which pass screws 4. These screws screw into substantially triangular rings 5 which are also segmental or arc-shaped so as to be easily removable when it is desired to strip the carcass being manufactured from the core or form. The screws 4 also provide the necessary spacing means to accurately locate the segmental rings. Said rings 5 are each provided with a series of laterally extending pins 6 which serve to accurately locate the strands or cords of the tire carcass during the manufacture or building of the tire. These parts constitute the main elements used in forming the tire carcass.

In the forming of anchoring means shown in Figs. 1 and 2, two helical endless wire coils are located just within the pins 6, where they may be retained temporarily by any suitable means. These helical coils should have one-half the number of convolutions as there are pins on each side of the core. When the coils of wire have been fixed in position, the placing of the cords of the tire carcass may be proceeded with. One end of the cord is anchored in any suitable way and the looping of the cords proceeded with to form the first layer, as indicated by the numeral 7. To place the cord upon a coil of wire it is first doubled upon itself and the bight slipped over one of the convolutions, such as at 8. The cord is again looped or doubled upon itself and the bight placed over a convolution of the opposite wire coil, as indicated at 9. When the cord is pulled tightly about the core the bights will be slightly separated and drawn upward on the inside of the coils until they assume positions shown in Figs. 2 and 3.

It should be noted that when the bights of the cords are placed over the coils, the two runs or sides of the loop are placed between adjacent pins 6 on the rings 5, thus accurately locating the cords, irrespective of any inaccuracy in the position of the wire coils. It should also be noted that the cords are preferably run diagonally across the core in the usual way now employed in building cord tires.

When the inner layer of cords has been completely placed in position about the entire surface of the core, the last run will come into position near the first end which was temporarily anchored in position. The two ends may then be tied together, or the same cord continued without cutting so that the second layer of cords is formed in a manner similar to the first except that the angle of the cords is preferably made opposite to that of the first as regards the axis of the tire. This will come into position on the wire coils as indicated at 10 and 11, and depending upon the thickness of the cords, will be drawn up to a point slightly removed from the bights of the first layer of cords, as indicated in Figs. 2 and 3. The sides or runs of the loops are also placed between the adjacent pins 6 so as to accurately locate the loops.

It is obvious that the cords may be previously impregnated with rubber compound before looping over the wire coils, or may be impregnated after having been placed in position. I prefer to impregnate them previous to placing them in position as the adhesiveness of the rubber tends to hold them temporarily in position. After the two layers of cords have been completely wound or looped over the wire coils, the inextensible bead wires indicated by the numeral 12 are placed in position. These are preferably passed in successive turns through the unoccupied portion of the wire coils so that they lie substantially at the bottoms of the convolutions. They may be bound together in any suitable way so as to form the inexpansible bead cores for the tire carcass and will assume a form substantially that shown at 12 in Fig. 2.

In Fig. 6 I have shown a modified form of helical wire coils in which the number of convolutions are equal to the number of pins. In this form the bights or loops of the cord of the first layer are passed over every other convolution of the wire and when the second layer of cords is placed in position, the bights are passed over the convolutions not occupied by the first layer of cords.

In Fig. 7 I have shown another modification in which the bead wires 13 are passed through the second set of helical coils indicated at 14, which coils are intermeshed with the coils of the first set. This form is of particular advantage where the space left after looping the cords in position, as in Fig. 2, is not sufficient to easily accommodate the bead wires, or where it is found necessary to use smaller sized coils, and will accommodate both the cords and the bead wires.

In Fig. 4 I have indicated a form of core which may be used in the same manner as that shown in Figs. 1 and 2, but is intended particularly for use where the carcass is vulcanized or cured on a separate core from that on which it is built. The core 15 in Fig. 4 may be made of wood or any material desired. It therefore may be made lighter than if made of cast iron, as are the usual cores for vulcanizing tire carcasses.

The form of core shown in Fig. 2 when made of cast iron may be used for vulcanizing or forming the tire carcass without removing the core. In which case it is only necessary to withdraw the spacing screws 4 and the bolts which retain the angle pieces 3. The bead-forming rings may then be clamped or bolted into position in the place of the angle irons 3, or the core placed in a closed mold to form the usual clencher edges or the inextensible straight edges of the Dunlop tire.

In Fig. 5 I have illustrated a modified form of core for building core tires. In this form the plate 16 carries pins 17 in a manner similar to that illustrated in Fig. 4. An annular ring 18 is then located outside of the central ring 16 by means of suitable spacing screws 19, or similar devices. In building the tire carcass in this instance, the helical coils 20 are located on top of the pins 17 instead of underneath the same, as in Figs. 2 and 4. Instead of looping the bights of the cords over the convolutions of the coils, the cords of the first layer 21 are placed so that their bights pass over the pins 17 and also include one of the convolutions of the coil 20. The single wire 22 is then passed inside of the cords 21 where it is held temporarily in position. The second layer of cords 23 is then placed in position, the bights extending over the pins 17, each including one of the convolutions of the coil 20. A second wire 24 is then passed between the outer sides of the coil 20 and the cords 23. The numeral 25 indicates one of the strands of the bead wires in position between the respective loops of the cords 21 and 23. The bights or loops of the cords are then removed from the pins 17 and the wire coils pulled downward between the same so that the ends of the loops are moved upward, as indicated in Fig. 8, thus embracing the wires 22 and 24. The strands of the inextensible bead wires 25 are then completed, as indicated in Fig. 8. Thus it will be seen that the bights of the cords 21 and 23 engage the opposite sides of the convolutions of the wire coils, instead of both engaging the same side, as indicated in Figs. 2 and 4.

It will be apparent that the coils need not necessarily be placed in the margins of the tire casing in their helical form but may be bent or compressed to conform to any desired shape corresponding to the size and shape of the bead or edge portions of the tire, as illustrated for example in Fig. 9.

Sheet rubber stock may be placed upon the core before the first series of cords is laid and also may be placed outside the first layer of cords before the second is laid.

Various other arrangements for assembling the wire coils and cords of the tire carcass may be devised by those skilled in the art, without departing from the spirit and scope of my invention, and I do not wish to be understood as being limited to the particular arrangements illustrated.

Having described these forms of my invention what I claim and desire to protect by Letters Patent is:

1. An anchorage for cords or strands of a tire carcass, comprising successive turns of helical coils over which the cords of said tire are looped.

2. An anchorage for cords or strands of cord tires, comprising successive turns of an endless helical coil over which the cords of said tire are looped, and means for preventing radial expansion of said helical coil.

3. An anchorage for cords or strands of a tire carcass, comprising successive turns of endless helical coils over which the cords of said tire are looped, and inexpansible cord or cable passing through said loops for preventing radial expansion of said helical coils.

Signed at Jersey City, New Jersey, this 10th day of July, 1916.

BENJAMIN L. STOWE.